No. 671,183. Patented Apr. 2, 1901.
C. A. COMSTOCK.
VALVE GEAR.
(Application filed Aug. 3, 1900.)

(No Model.) 4 Sheets—Sheet I.

WITNESSES:
Th. M. McNair
Wm. O'Laughlin

INVENTOR.
Clarence A. Comstock
BY H. A. Toulmin.
ATTORNEY.

THE NORRIS PETERS CO., PHOTO-LITHO., WASHINGTON, D. C.

No. 671,183. Patented Apr. 2, 1901.
C. A. COMSTOCK.
VALVE GEAR.
(Application filed Aug. 3, 1900.)

(No Model.) 4 Sheets—Sheet 2.

WITNESSES:
Jas. C. Daw—
W. M. McNair

INVENTOR.
Clarence A. Comstock.
BY
ATTORNEY.

No. 671,183. Patented Apr. 2, 1901.
C. A. COMSTOCK.
VALVE GEAR.
(Application filed Aug. 3, 1900.)
(No Model.) 4 Sheets—Sheet 3.
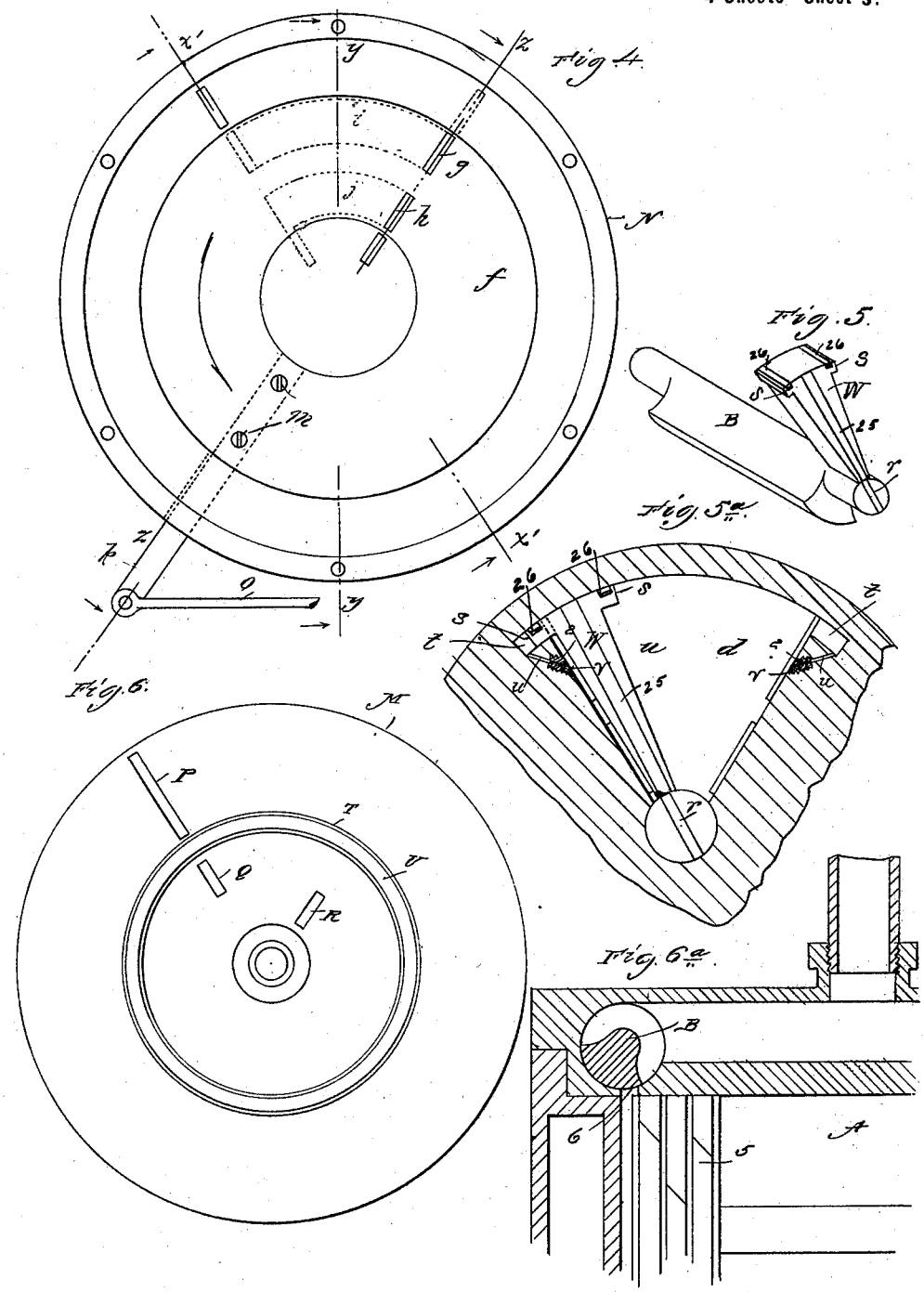
WITNESSES:
INVENTOR.
Clarence A. Comstock
BY
ATTORNEY.

No. 671,183. Patented Apr. 2, 1901.
C. A. COMSTOCK.
VALVE GEAR.
(Application filed Aug. 3, 1900.)
(No Model.) 4 Sheets—Sheet 4.
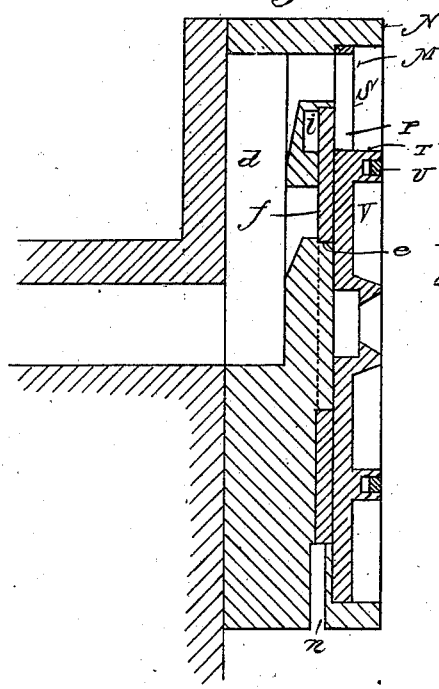
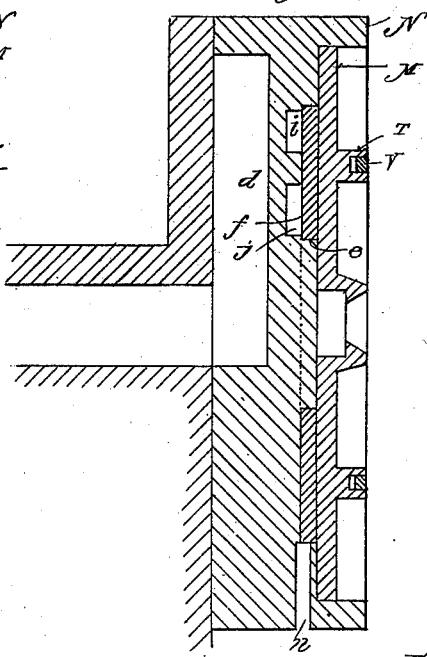
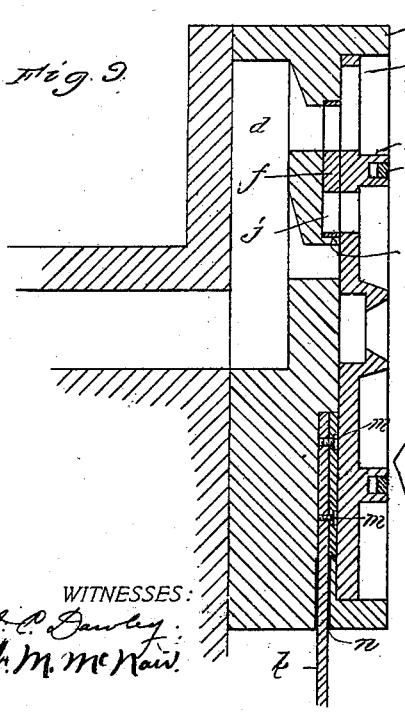
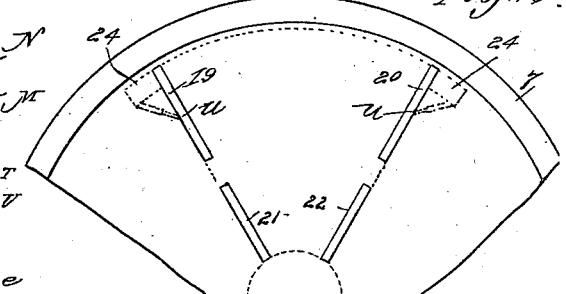
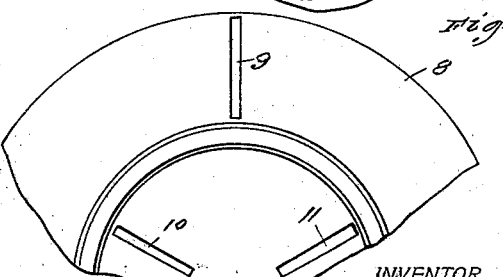
WITNESSES:
INVENTOR.
C. A. Comstock
BY
ATTORNEY.

UNITED STATES PATENT OFFICE.

CLARENCE A. COMSTOCK, OF MADISON, WISCONSIN.

VALVE-GEAR.

SPECIFICATION forming part of Letters Patent No. 671,183, dated April 2, 1901.

Application filed August 3, 1900. Serial No. 25,793. (No model.)

*To all whom it may concern:*

Be it known that I, CLARENCE A. COMSTOCK, a citizen of the United States, residing at Madison, in the county of Dane and State of Wisconsin, have invented certain new and useful Improvements in Valve-Gear, of which the following is a specification, reference being had therein to the accompanying drawings.

This invention relates to certain new and useful improvements in valve-gear, particularly for valves of the Corliss type.

The general object of my invention is to provide mechanism for instantly opening and closing Corliss valves through the action of a pressure medium whereby steam may be instantly admitted to an engine-cylinder and may also be retained in such cylinder for a greater length of time, so that a greater amount of power may be derived therefrom.

Another object of my invention is to provide mechanism for automatically varying the admission of the pressure medium to a piston-chamber in which is mounted a piston that is connected with a Corliss valve, whereby the action upon the Corliss valve itself is varied, so that the Corliss valve will automatically admit to and also cut off steam from an engine-cylinder at the proper time in order that the steam may be admitted in proper quantities to correspond with the work required to be done, thereby constituting an automatic variable cut-off.

My invention also relates to details of construction and organization hereinafter appearing, and particularly pointed out in the claims.

Figure 1:
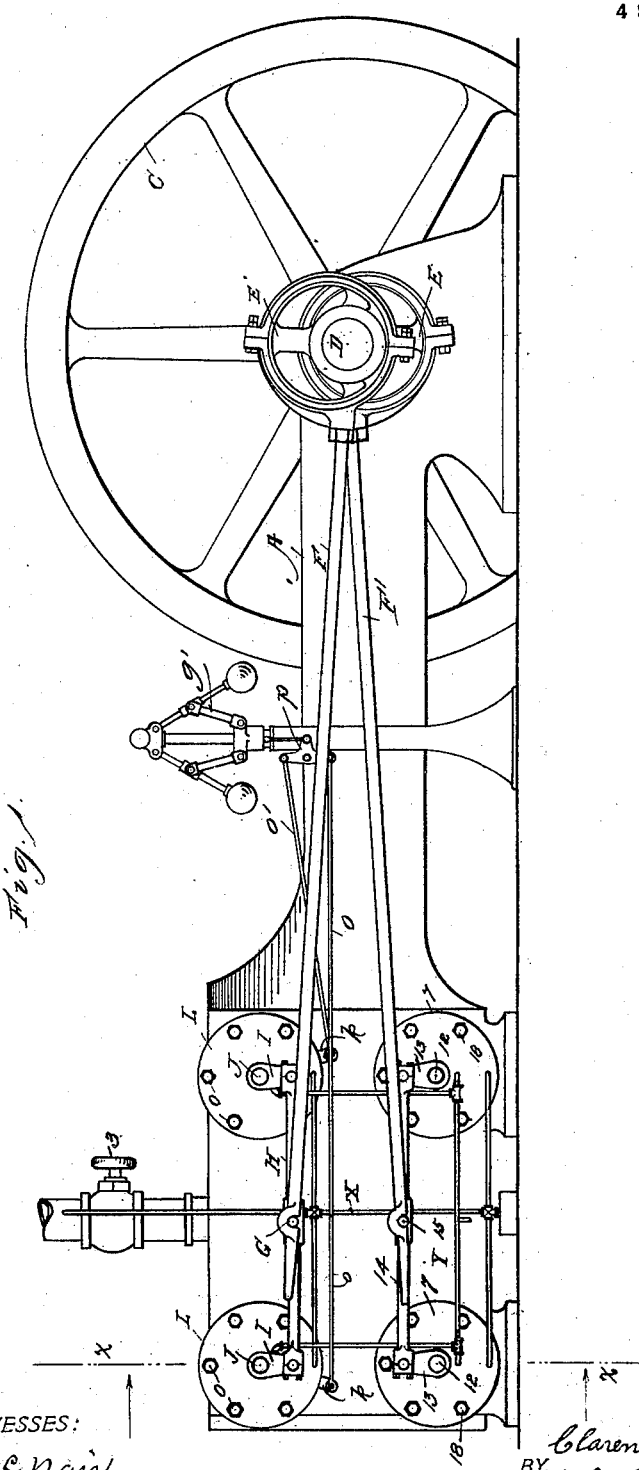
Figure 2:
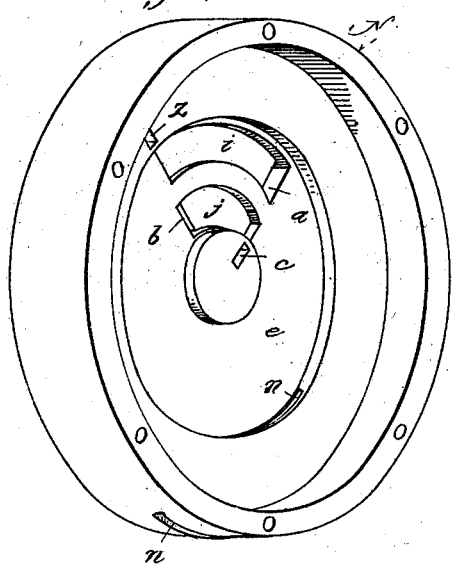
Figure 3:
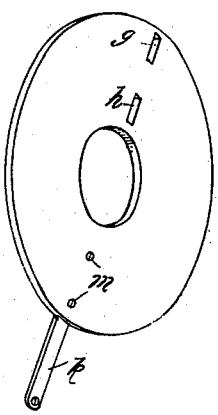
Figure 3:
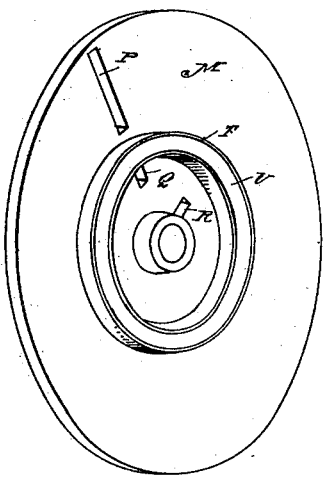
Figure 3:
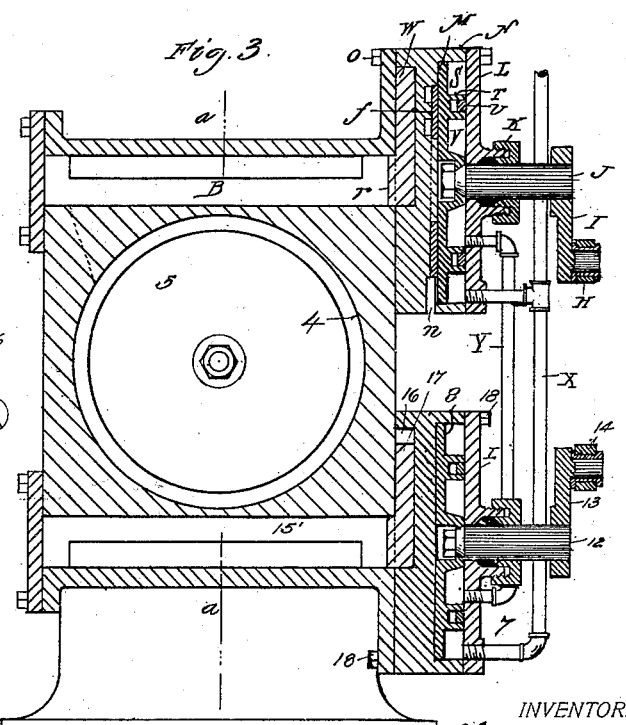

In the accompanying drawings, on which like reference characters indicate corresponding parts, Figure 1 is a side elevation of an engine employing Corliss valves with my improvements applied thereto; Fig. 2, a detail perspective view of my improved valve-casing before attaching to an engine; Fig. 2ª, a detail perspective view of a governor-controlled ring for fitting within the valve-casing; Fig. 2ᵇ, an enlarged detail perspective view of a partially-rotatable valve for fitting within said valve-casing; Fig. 3, an enlarged sectional view on the line $x\ x$ of Fig. 1 looking in the direction of the arrows; Fig. 3ª, a detail perspective view of an exhaust Corliss valve and operating-piston; Fig. 4, a detail enlarged end view of the pressure-medium casing with the front or head removed, together with the partially-rotatable valve, to illustrate the interior of the casing, as also the relation of the governor-controlled ring thereto; Fig. 5, a detail perspective view of a Corliss valve with my valve-piston connected therewith for operating it; Fig. 5ª, a rear view of a portion of the casing, illustrating one of the valve-pistons mounted in its piston-chamber and showing the manner in which the dash-pots for the valve-piston are freed of water, &c.; Fig. 6, an enlarged front view of one of the partially-rotatable valves, showing a steam-port and two exhaust-ports therein; Fig. 6ª, a partial sectional elevation on the line $a\ a$ of Fig. 3 and showing one of the Corliss valves in position; Fig. 7, a sectional view on the line $x'\ x'$ of Fig. 4 looking in the direction of the arrows; Fig. 8, a sectional view on the line $y\ y$ of Fig. 4 looking in the direction of the arrows; Fig. 9, a sectional view on the line $z\ z$ of Fig. 4; Fig. 10, a front view of a portion of an exhaust-valve casing, showing two steam-ports and two exhaust-ports therein; and Fig. 11, a front view of a portion of a partially-rotatable valve for the exhaust-valve casing and showing one steam-port and two exhaust-ports therein.

The letter A represents an engine of the usual or any approved construction using Corliss valves or valves of a similar character for admitting and cutting off the steam-supply and also for opening the exhaust-ports to permit the steam to escape.

I will first describe the mechanism for operating the Corliss inlet-valves, such inlet-valves being shown at B, and will thereafter describe the mechanism for operating the Corliss exhaust-valves.

The letter C represents an ordinary flywheel mounted on the main driving-shaft D. Upon the same shaft is also mounted a pair of eccentrics E E', which operate eccentric-rods F and F', respectively. The eccentric-rod F engages with a pin G, carried by a connecting or crank rod H, which connects a pair of cranks I with each other. Such cranks are rigidly attached to valve-stems J. These valve-stems project outward through the stuffing-boxes K in the heads L from partially-rotatable valves M. (See Fig. 3.) Each of the valves M is rotatably mounted in a shell or casing N, which is secured to the engine-body by means of screws O or in any other suitable manner. The valves M have a steam-port P, as also a pair of exhaust-ports Q and R, therein. (See Fig. 2ᵇ.) The steam-port P communicates with a chamber S, Fig. 3, formed between the valve and head L and also outside of an annularly-grooved projection T, which carries a packing-ring U in said groove, so as to form a steam-tight joint between the chamber S and a chamber V. The chamber V is for the reception of the exhaust pressure medium, such as exhaust-steam, after having operated the Corliss-valve-operating piston W, as will hereinafter appear, while the chamber S is for the reception of live steam or other suitable pressure medium before it acts upon the piston W. A system of pipes X conduct live steam into the chambers S, while a system of pipes Y conduct the exhaust-steam from the chambers V. From Fig. 2 it will be seen that the casing N, which is screwed or otherwise secured to the engine, has a pair of steam-inlet ports z and a therein, as also a pair of exhaust-ports b c therein. These ports communicate with a piston-chamber d, formed in the casing N, immediately back of the inlet and exhaust ports, (see Figs. 4, 5ᵃ, 7, and 10 particularly,) the inlet-port Z opening at one end of the piston-chamber d, while the inlet-port a opens at the other end of said piston-chamber. Between the partially-rotatable valve M and the valve-casing is formed an annular depressed seat e, (see Fig. 2,) in which is mounted a governor-controlled ring f, through which extends a pair of ports g and h, respectively, the port g being immediately in front of a tunnel or passage i, (see Figs. 2 and 3,) leading to the steam-inlet port a, while the port h is immediately over a passage or tunnel j, communicating with the exhaust-port b. To the governor-controlled ring f is secured an arm k by means of screws m, and which projects through a slot or opening n, formed in the casing N for this purpose. To the lower end of the arm is connected a rod o, which connects with a T-lever p, operated by an ordinary ball-governor g'. (See Fig. 1.)

The valve-operating piston W within the chamber d carries at its lower inner end a projection r, which fits into the end of one of the Corliss valves B for operating such Corliss valve in a manner hereinafter appearing. The upper end of the piston W has a projection s extending from each side thereof, which projections are adapted to fit snugly within pockets constituting dash-pots t at each side of the piston-chamber d. A pair of diagonal passages u connect the inner ends of the dash-pots with the piston-chamber d in such a manner that all condensation in the dash-pots may run out into the chamber and pass out with the exhaust-steam, as will presently appear. The inner ends of these passages are each provided with a plug v, which has a passage 2 therein of a reduced size compared with the passage u. This construction permits the condensation to freely drain out of the dash-pots, yet at the same time holds the pressure medium from passing out of the dash-pots until after it has formed a cushion for the piston W at each side of the chamber d. The projections from the pistons are of sufficient length to hold the piston away from the ends of the chambers sufficient for the pressure medium to readily pass behind the piston.

I will now describe the operation of this improved valve mechanism and also the manner in which the pressure medium acts upon the Corliss-valve-operating piston W. Let it be supposed that the partially-rotatable valve M is placed within the casing N after first placing in position the governor-controlled ring f, and that such valve has its inlet-port P over the inlet-port Z in the casing, and that steam is permitted to enter the live-steam chamber S after first opening the inlet cock or valve 3. The live steam will at once pass in behind the piston W, which is adjacent to the inlet-port Z. This will instantly cause the piston W to travel to the opposite end of the chamber d, which action will instantly turn one of the Corliss valves B, to which the piston W is connected, to admit steam into the steam-cylinder 4. Within this cylinder is mounted the usual piston 5, which, it will be understood, is in the proper position to be acted upon by the steam admitted through the Corliss valve B. The instant the Corliss valve is to be closed to prevent the further admission of steam into the engine-cylinder the inlet-port P in the partially-rotatable valve M matches with the inlet-port g in the governor-controlled ring, so that the steam or pressure medium will instantly throw the piston back to its initial position by reason of the pressure medium passing in behind the piston through the tunnel i and inlet-port a in the casing. Thus the steam entering the engine-cylinder will at once be cut off by the Corliss valve. While this is taking place, it will be understood that the exhaust-port h in the governor-controlled ring f is opposite the port Q in the partially-rotatable valve M, so that the exhaust-steam may pass out from behind the piston W through the tunnel j and exhaust-ports Q and h and into the exhaust-chamber V, from whence it escapes through the system of outlet-pipes Y. As the pressure medium enters the inlet-port Z at one side of the piston W while in its initial position, as indicated in Fig. 5ᵃ, it will be understood that the exhaust-port R in the partially-rotatable valve is over or in matching relation with the exhaust-port c in the casing, thus also permitting the exhaust-steam to pass into the exhaust-chamber V and out through the system of pipes Y, as above stated. Should the load of the engine be decreased, the governor immediately acts upon the connecting-rod o to rotate the governor-controlled ring in the direction of the arrow, as indicated in Fig. 4. This rotation of such ring carries the inlet-port g, as also the exhaust-port h, toward the inlet-port Z, so that the inlet-port in the partially-rotatable valve matches with the inlet-port g in the governor-controlled ring sooner than would otherwise be the case were the engine running under a normal load. This permits the steam to pass through the tunnel i and inlet-port a in the casing N and back of the piston W, while the exhaust medium passes out through the exhaust-port b and tunnel j in the casing N, as also through exhaust-port h in the governor-controlled ring f and exhaust-port Q in the partially-rotatable valve M, so that said piston may be instantly thrown to its initial position, as indicated in Fig. 5, thereby also operating the Corliss valve B (see Fig. 6ª) to instantly close the passage 6, entering the engine-cylinder. Thus with my improved organization I have a variable automatic cut-off operating in accordance with the load on the engine or the work being performed by the engine. Inasmuch as the inlet-port Z and the exhaust-port C have fixed positions in the casing and the inlet-port P and the exhaust-port R in the partially-rotatable valve are adapted to match with said respective inlet and exhaust ports, the variation in the operation of the Corliss-valve-operating piston W will always occur when the piston is operating to close the Corliss valve, thereby cutting off the steam sooner or later in passing into the cylinder.

Of course it will be understood that there are two sets of valve-operating mechanisms, one at each end of the engine-cylinder, for operating the inlet Corliss valves at the respective ends of the cylinder, so that the steam or other pressure medium may be admitted first into one end of the engine-cylinder and then into the other end, such valve-operating mechanisms being interconnected through the connecting or crank rod H, as heretofore described. Through this crank-rod the cranks are thrown in the same direction, so that by the same operation one of the Corliss-valve-operating pistons W is operated in one direction to cause the Corliss valve to which it is connected to admit steam, while the other Corliss operating-piston is thrown in the opposite direction to cause the other Corliss inlet-valve to cut off the steam from passing into the opposite end of the cylinder, it being understood that the valve-operating mechanisms for operating the inlet Corliss valves have their parts arranged to operate oppositely to each other.

I will now refer to the exhaust mechanisms for operating the Corliss exhaust-valves. From Fig. 1 it will be seen that immediately beneath the inlet-valve casings are mounted the exhaust-valve casings 7. In each of these casings is mounted similar mechanism to that contained in the casings N for operating the Corliss valves to admit the steam, with the exception that the governor-controlled ring is omitted, and I employ nothing but a partially-rotatable valve 8 with one steam-port 9 and two exhaust-ports 10 and 11, respectively, (see Fig. 11,) similar to the partially-rotatable valve M, and which has also connected to it a valve-stem 12, to which is connected a crank 13. To this crank is attached a connecting-rod 14, carrying a pin 15, over which fits the eccentric-rod F'. The connecting-rod 14 also connects with another crank 13, extending outward from the partially-rotatable valve in the second exhaust-valve-operating casing 7.

As one of the exhaust Corliss valves 15' (see Fig. 3) is operated in one direction to permit the steam to exhaust from the engine-cylinder, the other Corliss exhaust-valve is closed, so that the steam is held in the engine-cylinder. Each of the exhaust-valves has connected to it a piston 16, similar to the piston W, attached to the Corliss inlet-valves B, such pistons reciprocating in a chamber 17 in one of the casings 7, secured to the engine-cylinder by means of screws 18 or in any other suitable manner. The port 9 in the partially-rotatable valve 8 matches with ports 19 and 20, respectively, in the casing 7. (See Fig. 10.) Consequently as the valve 8 is rotated through its connection with the eccentric F' steam will be admitted to the chamber 17 and the Corliss exhaust-valve 15' will be opened or closed, according to which side of the piston 16 the steam is admitted. It will be understood that the exhaust-steam passes out through ports 21 and 22, respectively, in the casing 7 (see Fig. 10) and also out through the respective ports 10 and 11 in the partially-rotatable valve 8.

Each of the pistons 16 is provided with projections 23 from each side similar to the projections s from the pistons W, (see Fig. 3ª,) which fit into pockets or dash-pots 24 at each side of the chamber 17. (See dotted lines in Fig. 10.) These pockets or dash-pots 24 are drained in a similar manner to the dash-pots t.

From the above description it will be understood that each of the eccentric-rods F F' is attached to connecting or crank rods H and 14, respectively, and that the crank-rod H operates a pair of valve-operating mechanisms for admitting and cutting off steam to an engine-cylinder, while the crank or connecting rod 14 also connects a pair of valve-operating mechanisms for holding steam within the engine-cylinder and also for releasing the steam therefrom, the inlet-valves being operated to cut off the steam according to the load upon the engine, while the exhaust-valve-operating mechanisms have a constantly-uniform movement—that is, the exhaust-valves are opened at a certain time with respect to the rotation of the main driving-shaft and are also closed at a certain time with respect to the rotation of such shaft.

Each of the Corliss-valve-operating pistons is provided with suitable packing on its sides and ends, as indicated at 25 and 26, respectively. (See Figs. 3ª, 5, and 5ª).

Having thus fully described my invention, what I claim as new, and desire to secure by Letters Patent, is—

1. In mechanism for operating valves, the combination with a casing, of a piston-chamber therein, a piston mounted in said chamber adapted to be connected with an engine inlet-valve, a rotatable valve mounted in said casing, said valve having an inlet-port and two exhaust-ports therein, said casing having a pair of inlet-passages and a pair of exhaust-passages therein leading into said piston-chamber, and means for partially rotating said valve in said casing, and means for conducting steam to said inlet-ports, all substantially as shown and described.

2. In mechanism for operating valves, the combination with a casing having a piston-chamber therein, a piston mounted in said chamber adapted to engage with valves for controlling the steam in an engine-cylinder, said casing having a pair of inlet-ports and a pair of exhaust-ports therein communicating with said piston-chamber, a partially-rotatable valve mounted in a recess in said casing having an inlet and a pair of exhaust ports therein for registering with the respective inlet and exhaust ports of said casing, a valve-stem connected with said partially-rotatable valve, an eccentric connected with said valve-stem for partially rotating said valve, all substantially as shown and described.

3. In mechanism for operating valves, the combination with a casing having a piston-chamber and steam inlet and exhaust ports therein, said casing having a pair of steam-inlet ports and a pair of exhaust-ports therein, an inlet-valve also mounted in said casing having a inlet-port and a pair of exhaust-ports therein and adapted to match with the respective inlet and exhaust ports in said casing, a projection extending from one face of said ring, a packing carried by said projection, a head adapted to fit against said casing and upon said packing, the projection from said valve forming two spaces between the valve and head, one for the reception of live steam and the other for exhaust-steam, and means for connecting the respective spaces for the admission of steam thereto and emission of exhaust-steam therefrom, all substantially as shown and described.

4. In mechanism for operating valves, the combination with a casing having a valve-chamber and a recess therein, said casing also having a pair of steam-admission ports and a pair of exhaust-ports therein between said piston-chamber and recess, a partially-rotatable valve mounted in said recess having an inlet-port and one or more exhaust-ports therein, means for partially rotating said valve, a governor-controlled ring also mounted in said casing between the partially-rotatable valve and the casing and adapted to control one of said inlet-ports and one of said exhaust-ports, and a governor connected with said governor-controlled ring, all substantially as shown and described.

5. In mechanism for operating valves, the combination with an engine proper, of a pair of valves connected with the cylinder of said engine for admitting steam at each end thereof, mechanism for connecting with each of said valves consisting of a casing having a plurality of recesses therein, one constituting a valve-chamber and the other a piston-chamber, a piston mounted in its chamber connected with one of said valves, a partially-rotatable valve mounted in said valve-chamber, an eccentric-rod connected with said valve for partially rotating it, inlet and exhaust ports connecting said chambers with each other, said partially-rotatable valve also having inlet and exhaust ports therein for opening and closing the respective inlet and exhaust ports in said casing, means for conducting a pressure medium to the piston-chamber through the partially-rotatable valve, and means for operating said valve-operating mechanisms one at a time, all substantially as shown and described.

6. In mechanism for operating valves, the combination with an engine-cylinder, of a pair of valve-operating mechanisms secured thereto, a valve for each end of said cylinder adapted to be operated by said respective mechanisms, said mechanisms each consisting of a casing having a piston-chamber therein and steam inlet and exhaust ports therein, a rotatable valve mounted in each of said casings, a valve-stem projecting from each of said valves carrying a crank, a connecting-rod for connecting said cranks together, an eccentric operated by said engine and connected with said connecting-rod, each of said casings and said rotary valves having exhaust-ports and inlet-ports therein for respectively registering with each other, and means for introducing a pressure medium into said pressure-chamber and releasing said medium through the exhaust-chamber, all substantially as shown and described.

7. In mechanism for operating valves, the combination with an engine proper having a pair of admission-valves and a pair of exhaust-valves therein, a piston connected with each of said valves, a casing having a piston-chamber therein for the reception of said pistons, said casing having inlet and exhaust ports therein, a rotatable valve also mounted in said casing and having an inlet and a pair of exhaust ports therein, means for interconnecting the inlet-valve-operating mechanisms together for operating said rotatable valve, and means for interconnecting said exhaust mechanisms together for operating their rotary valves, and means for conducting a pressure medium into each of the piston-chambers at each side of said pistons respectively, and means for conducting exhaust-steam from said piston-chambers, all substantially as shown and described.

In testimony whereof I affix my signature in presence of two witnesses.

CLARENCE A. COMSTOCK.

Witnesses:
MCCLEMENT E. TYNER,
HARY L. POTTER.